(12) United States Patent
Hobson, Sr. et al.

(10) Patent No.: US 9,149,944 B2
(45) Date of Patent: Oct. 6, 2015

(54) RAZOR BLADE TECHNOLOGY

(71) Applicant: Eveready Battery Company Inc., St. Louis, MO (US)

(72) Inventors: Wayne F Hobson, Sr., Huntington, CT (US); Yiming Xu, Milford, CT (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 14/568,232

(22) Filed: Dec. 12, 2014

(65) Prior Publication Data

US 2015/0096164 A1    Apr. 9, 2015

Related U.S. Application Data

(63) Continuation of application No. 13/349,706, filed on Jan. 13, 2012.

(51) Int. Cl.
  *B26B 21/60* (2006.01)
  *B23P 15/00* (2006.01)
  *B26B 21/40* (2006.01)
  *B23P 15/40* (2006.01)

(52) U.S. Cl.
  CPC ........... *B26B 21/4068* (2013.01); *B23P 15/403* (2013.01)

(58) Field of Classification Search
  CPC . B26B 21/4068; B26B 21/565; B23P 15/403; Y10T 29/49888; Y10T 29/49885
  USPC ........... 30/346.53, 50, 346; 76/101.1; 29/458, 29/460
  See application file for complete search history.

(56) References Cited

U.S. PATENT DOCUMENTS

| | | | | |
|---|---|---|---|---|
| 3,480,483 A | * | 11/1969 | Wilkinson | 148/276 |
| 3,522,037 A | * | 7/1970 | Wilde et al. | 420/42 |
| 3,852,883 A | * | 12/1974 | Ferraro | 30/346.58 |
| 4,586,255 A | | 5/1986 | Jacobson | |
| 5,010,646 A | * | 4/1991 | Neamtu | 30/50 |
| 7,681,314 B2 | | 3/2010 | Follo | |
| 2006/0242844 A1 | | 11/2006 | Skrobis et al. | |
| 2006/0277759 A1 | | 12/2006 | Follo | |
| 2009/0007442 A1 | | 1/2009 | Kurihara | |

OTHER PUBLICATIONS

International Search Report of PCT/US2010/041964, filed Jul. 14, 2010.

* cited by examiner

*Primary Examiner* — Ghassem Alie
(74) *Attorney, Agent, or Firm* — Edgewell Personal Care Brands, LLC.

(57) ABSTRACT

A razor cartridge includes razor blade assemblies having an inter-blade guard attached to a side of a razor blade. The razor blade is formed from strip that is manufactured including a thermal oxidation process to form a chromium oxide layer on the side surface of the razor blade. This oxide film prevents electrochemical corrosion of the razor blade that may be visible to a user and prevents real or perceived premature failure of the razor blade and thus the razor cartridge during its extended life. The razor blade assembly may also have an array of closely spaced droplets of a liquid adapted to inhibit corrosion of the razor blade applied to the side of the razor blade visible to a user.

5 Claims, 4 Drawing Sheets

RAZOR BLADE TECHNOLOGY

CROSS REFERENCE TO RELATED APPLICATIONS

This application is a continuation of U.S. patent application Ser. No. 13/349,706, filed Jan. 13, 2012 which claims the benefit of International Application PCT/US2010/041,964, filed Jul. 14, 2010 which claims the benefit of U.S. provisional patent application Ser. No. 61/225,586, filed Jul. 15, 2009, the contents of which are incorporated herein for reference in their entireties.

BACKGROUND

1. Technical Field

The present disclosure relates to razor blades for razor cartridges in general and, more particularly, to a method of manufacturing a razor blade.

2. Background

Many modern safety razors include a disposable razor cartridge adapted to be selectively connected to a reusable handle by connecting structure therebetween. The cartridge includes a housing having at least one razor blade with a cutting edge disposed therein. Other modern safety razors include a razor cartridge permanently connected to the handle that can be disposed of as a single unit.

In commonly assigned U.S. patent application Ser. No. 11/150,744, published as US 2006/0277759, now U.S. Pat. No. 7,681,314, the desirability of providing a razor blade assembly including an inter-blade guard joined to a razor blade is disclosed. The provision of an inter-blade guard permits adjacent cutting edges to be spaced sufficiently far apart in their razor cartridge to allow adequate rinsing of debris from the space between adjacent blades and any respective support structure while the inter-blade guard provides a skin engaging/skin supporting surface between adjacent cutting edges to control skin bulge and provide improved shaving comfort and reduction of nicks and cuts. The inter-blade guard is mounted on the razor blade in a position generally visible to a user during normal use and handling of the safety razor.

A razor cartridge including a razor blade having a bent portion can have certain advantages and there have been many proposals to provide a razor cartridge with such a razor blade. However, such razor cartridges have not been successfully commercialized or at least not manufactured on a scale that is significant in a mass market such as that of razor cartridges. Many manufacturers emulate a bent razor blade by mounting a generally planar razor blade on a bent support made from a material both thicker and softer than a typical hardened razor blade. U.S. Pat. No. 4,586,255 to Jacobson discloses a typical construction of a blade mounted on a support. The support is mounted on the opposed side of the razor blade to the blade guard of the aforementioned U.S. Pat. No. 7,681,314 the razor blade and is at least partially hidden from view by a user during normal use and handling of the safety razor.

Modern safety razors are normally used and can be stored by a user in a more or less wet or humid environment. In normal use, the razor blades of a razor cartridge are brought into contact with mildly corrosive substances, such as the constituents of sweat, soap, and shaving aids such as shaving foam or gel. Also the nature and composition of tap water (which is generally used for shaving) can vary from city to city. In view of these ambient conditions, martensitic stainless steels have become widely used as a corrosion-resisting material for making razor blades having a high level of cutting quality.

The inter-blade guard on the other hand is preferably manufactured from a fully annealed low-carbon stainless steel such as grade AISI 301/DIN 1.4310. This material is chosen for several reasons including ease of forming its desired profile, such as those disclosed in the aforementioned U.S. Pat. No. 7,681,314. For convenience of assembly, the inter-blade guard can be joined by welding, e.g. laser spot welding, to its respective razor blade.

Small compositional differences can thus exist between the razor blade and its inter-blade guard assembled thereto. In use, moisture and other constituents can be trapped and retained between the razor blade and its inter-blade guard. This can act as an electrolyte and thus the razor blade, inter-blade guard and moisture therebetween can comprise an electrochemical cell that can result in localized electrochemical corrosion of the razor blade. As the inter-blade guard is mounted on the razor blade in a position visible to a user any such corrosion can also be visible to a user and can be at least considered unsightly and may cause real or perceived premature failure of the razor blade and thus razor cartridge having such a razor blade assembly. Moreover, many modern safety razor cartridges can have an extended useful life compared to earlier razor cartridges. Improved coatings on cutting edges (e.g. hard carbon) can increase the useful life of the cutting edge and improvements in the composition or construction of so-called lubricating strips can extend the life of the lubricating strip. A modern safety razor cartridge having an extended life has more opportunity to suffer corrosion during its life than an earlier razor cartridge.

SUMMARY

The present disclosure has for its objective to eliminate, or at least substantially alleviate the limitations of the prior art razor blade assemblies. The present disclosure in one aspect is directed to a method of manufacturing a razor blade assembly for a razor cartridge, comprising the steps of providing an elongated strip of stainless steel of a first composition, the strip including a front edge and a first side, processing the strip to effect a martensitic transformation to harden the strip, and providing a cutting edge extending along the front edge of the elongated strip. The strip is cut into lengthwise extending portions to provide discrete razor blades having a length suitable for use in a razor cartridge housing. A chromium oxide layer is formed on the first side of the razor blade by a thermal oxidation process. An inter-blade guard is permanently joined to the first side of the razor blade. The razor blade and the inter-blade guard comprise stainless steels of different compositions and the layer of chromium oxide prevents or delays the onset of user-visible electrochemical corrosion of the first side of the razor blade. The razor blade assembly is assembled to a housing to provide a razor cartridge. A predetermined array of closely spaced droplets of a liquid adapted to inhibit corrosion of the razor blade can be applied to a portion of the first side of the razor blade; a portion of a skin engaging surface of the inter-blade guard and can penetrate a gap between the first side and the inter-blade guard to further prevent or delay the onset of user-visible electrochemical corrosion of the first side of the razor blade. The application of the array of droplets a liquid adapted to inhibit corrosion of the razor blade is preferably performed to the assembled razor cartridge. The droplet array is preferably restricted to the razor blade assembly and suitably controlled so that the aforementioned liquid is not unnecessarily applied to e.g. outer surfaces of the housing.

These and other advantages of the present disclosure will be apparent to one of ordinary skill in the art in light of the following Detailed Description and Drawings.

DETAILED DESCRIPTION

Figure 1:
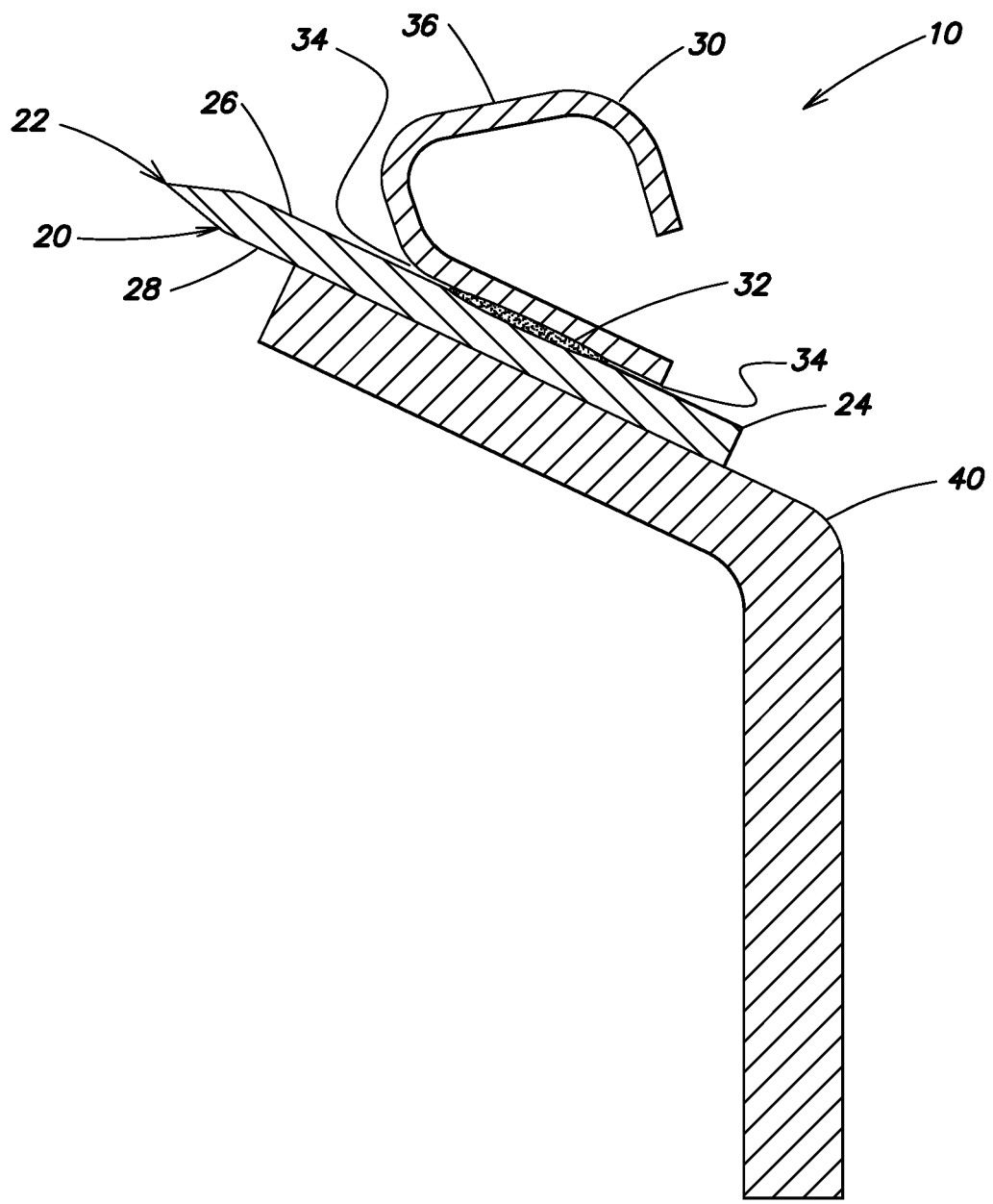
FIG. 1 is a sectional view of an embodiment of a razor blade and an inter-blade guard.

Referring now to the drawings, and in particular FIG. 1, a sectional view of a razor blade assembly 10 for use in a razor cartridge (100 in FIG. 3) is depicted. A razor blade 20 includes a stainless steel substrate, which typically has a thickness of about 0.05-0.10 mm. The stainless steel typically contains about 0.4 to 0.7% carbon and about 12 to 13.5% chromium, both by weight. The stainless steel has been hardened to effect a martensitic transformation to harden the substrate material to e.g. 700-850 HV. In the present disclosure, HV designates hardness measured on the Vickers scale at a 1.0 kg load. The blade 20 has a cutting edge 22 and a body 24 having a first side and a second side, 26, 28 respectively. An inter-blade guard 30 is attached to the first side 26 of the razor blade 20. The inter-blade guard includes a surface 36 adapted to contact a skin surface of a user during a normal use of the razor cartridge. Further desired features and function of the inter-blade guard are disclosed in the aforementioned U.S. Pat. No. 7,681,314, incorporated herein for reference in its entirety.

The inter-blade guard 30 is preferably manufactured from an annealed low-carbon austenitic stainless steel such as grade AISI 301 (DIN 1.4310) and has a thickness preferably in the range about 0.05-0.076 mm although the present disclosure is not limited in this regard and other materials that may be readily formed to a desired profile and/or joined to the razor blade may be usefully employed. The inter-blade guard 30 is permanently joined to the razor blade for example by a known laser spot welding process (FIG. 1 sectionally depicts the welding zone 32). Other joining methods may also be employed such as use of a suitable adhesive such as an epoxy (e.g. a two-part epoxy) or cyanoacrylate.

The razor blade assembly 10 can also comprise a support member 40 as is well known in the art.

The razor blade 20 is manufactured as follows. First, a rolled sheet of stainless steel is slit into elongated strips. The strips can be perforated for ease of handling during subsequent processing. Other pre-hardening steps, such as scoring, may be performed, if desired.

When the desired sequence of pre-hardening steps has been completed, the strip is subjected to a hardening process, which includes austenitization of the stainless steel. The hardening process is conducted in a first muffle furnace or tunnel oven. The strip is provided in coil form and is uncoiled and fed into the furnace where it is quickly ramped up to a high temperature, e.g., approximately 1160° C., maintained at this temperature for a period of time, during which austenization of the stainless steel occurs. The strip is then rapidly quenched (e.g. in an ice-box) to a low temperature e.g. approximately −70° C., to effect a martensitic transformation of the stainless steel substrate material. The strip is recoiled and passes to subsequent processes. The hardness of the strip thus processed has a hardness approximately 700-850 HV.

Figure 2:
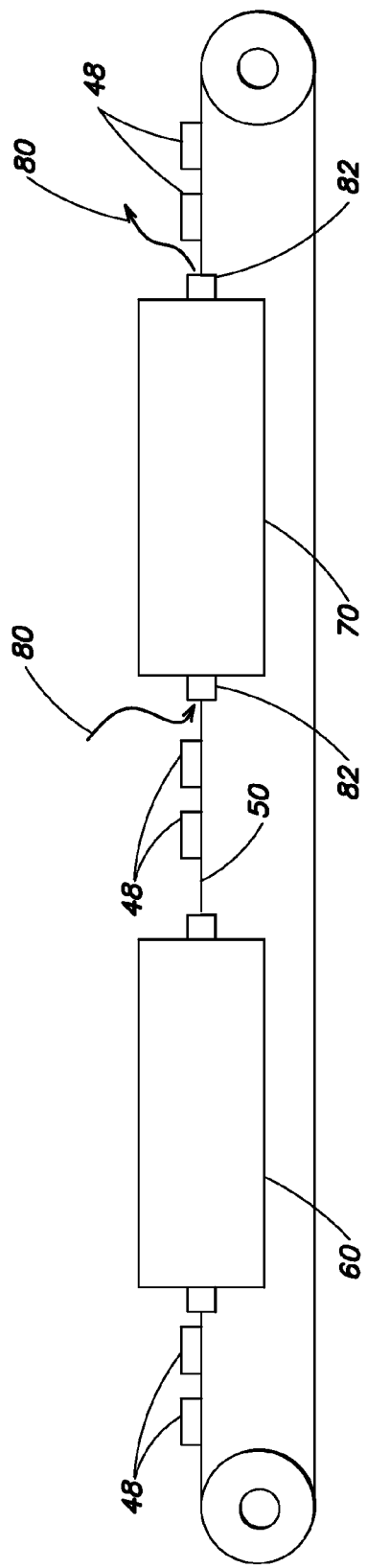
FIG. 2 is a schematic view of an embodiment of process equipment to provide a chromium oxide layer.

The strip is subsequently sharpened by known process steps to provide a cutting edge. After the process to provide a cutting edge the strip can be severed into lengthwise extending portions to provide razor blades having a length suitable for use in a razor cartridge and stacked one upon the other in suitable carriers or the strip can be recoiled for further processing. If necessary, the stack of razor blades (or recoiled strip) is then cleaned by any one of a number of processes known in the art to remove residues from the sharpening process and other contamination. Coatings are applied to the cutting edge that can be metallic (e.g. titanium, niobium or chromium), ceramic (e.g. chromium nitride) or hard carbon (e.g. amorphous diamond or DLC (diamond-like carbon) or combinations thereof and a further outer layer of a low friction coating of a fluorinated polymer such as PTFE is applied. The PTFE is applied by spraying a suspension of PTFE particles in a suitable medium such as water and/or alcohol on to the cutting edge(s). To effect a continuous adherent (i.e. cured) film of PTFE, the razor blades in their carrier or the strip in its coil are loaded on a conveyor and passed through a second muffle furnace or tunnel oven at approx 360° C. to cure the PTFE. Reheating the razor blades to perform the PTFE curing process has the effect of partially annealing the razor blades to a hardness about 600 HV or more, e.g. about 680 HV. The process equipment is schematically shown in FIG. 2 which depicts stacked blades in carriers 48 that are transported on conveyor 50 though furnace 60.

As previously mentioned, modern safety razors are normally used in a wet environment and can be stored by a user in a variably humid environment. When used, the razor blades of a razor cartridge are brought into contact with a variety of mildly corrosive substances in a variety of concentrations, such as the constituents of sweat, soap, and shaving aids such as shaving foam or gel. Furthermore, the composition of typical tap water as is generally used for shaving can vary from city to city. Moreover, modern safety razor cartridges can have an extended useful life compared to earlier razor cartridges. Improved coatings on cutting edges (e.g. hard carbon) can increase the useful life of the cutting edge and improvements in the composition or construction of so-called lubricating strips can extend the life of the lubricating strip of the razor cartridge. A modern safety razor cartridge having an extended life has more opportunity to suffer corrosion during its life than an earlier razor cartridge.

To enhance corrosion resistance of the stainless steel material of the razor blade over a range of possible use environments a chromium oxide layer is formed on outer sides (26, 28) by a thermal oxidation process. The razor blade is introduced into an atmosphere of clean dry air at approximately 160° C. to 215° C., e.g. 190° C. In simplified terms, the aforementioned hardening process converts a portion of the chromium and carbon of the stainless steel material to chromium carbide which partially provides the cited hardness. Some chromium remains unreacted with carbon and this so-called free chromium at the surface of the stainless steel is oxidized as follows to form a corrosion resisting chromium oxide layer on the stainless steel substrate.

The razor blades in their carrier are passed through a third muffle furnace or tunnel oven 70 that is preferably arranged sequentially with the second furnace 60 to advantageously benefit from the provision of the conveyor 50 for the PTFE curing process. The furnace is set to the aforementioned temperature 160° C. to 215° C., e.g. 190° C. and clean dry air 80 at ambient temperature is passed through the furnace muffle tube 82 in the direction indicated or in the reverse direction. The aforementioned temperature range is selected to avoid any significant further partial annealing of the razor blades. A chromium oxide layer is formed on the outer sides of the razor blades.

The thickness of the chromium oxide layer is preferably controlled to about 10 nm to about 15 nm thick (about 100 Å to about 150 Å). A thickness less than about 10 nm is less preferred as the razor blade can lack a desired increase in corrosion resistance. A thickness more than about 15 nm is less preferred as the corrosion resistance of the razor blade is not proportionately increased. Also a thickness of more than about 15 nm can result in an undesirable color change of the surface of the razor blade that can be subjectively recognized by a casual observer. Preferably the thickness of the chromium oxide layer does not substantially alter the color of the razor blade as a color change can be deemed commercially undesirable for a razor blade or a razor cartridge including such a razor blade. Control of the thickness of the chromium oxide layer can be controlled by primarily adjusting the time the strip is in the furnace (e.g. by adjusting the conveyor speed) and/or the temperature of the furnace and secondarily by adjusting the air flow rate through the muffle tube of the furnace.

In other embodiments the third furnace can be arranged separately from the second furnace. The third furnace can also be arranged sequentially with the first furnace and icebox in which case the oxide layer is formed on the strip before the provision of the cutting edge and subsequent coatings. As an alternative to use of a muffle furnace the third furnace can also be a sealed furnace and blade carriers or entire coils of strip can be processed therein in a so-called batch process.

It is known to provide a chromium oxide layer up to about 8 nm (80 Å) thick by chemical or electrochemical passivation. However, this process is undesirable in present-day manufacturing for various reasons including: capital cost; the environmental impact of use and subsequent disposal of the chemicals required and general storage, health and safety issues.

Corrosion resistance of strip or of a razor blade made from the strip or a razor cartridge including such a razor blade is assessed in an accelerated corrosion test as follows:
  a) A test specimen that can be include a portion of strip or a razor blade made from the strip or a razor cartridge including such a razor blade is dipped in a 0.2% salt solution at 60° C. for 10 seconds.
  b) The specimen is removed from the solution and placed in a Temperature/Humidity oven at 60° C., 95% RH (relative humidity) for 25 minutes.
  c) The specimen is removed from the oven and visually inspected at up to 2.5× magnification and any corrosion is compared to a predefined severity rating scale.
  d) Steps a) to c) are repeated for a total of 15 cycles.

Referring back to FIG. 1, the razor blade can be joined to a metallic support 40 as is well known in the art, e.g. as disclosed in U.S. Pat. No. 4,586,255 to Jacobson. An inter-blade guard 30 (as previously described) is joined to a side of the razor blade, the side being visible to a user during normal use and handling of the safety razor including such a razor blade. As can be seen in FIG. 1 certain narrow gaps 34 exist between the razor blade and the inter-blade guard that can trap moisture and/or a dilute mildly corrosive substance after use and retain said moisture etc by capillary/surface tension effects. As previously mentioned, the composition of the stainless steels of the razor blade and the inter-blade guard can be slightly different. Without the protective chromium oxide layer on the razor blade acting as an insulator an electrochemical cell could be created of an anode and cathode being the razor blade and inter-blade guard and an electrolyte being the moisture etc. thus resulting in electrochemical corrosion that will occur on the razor blade on a side visible to a user and that could be sufficient to be undesirably visible to the user.

Figure 3:
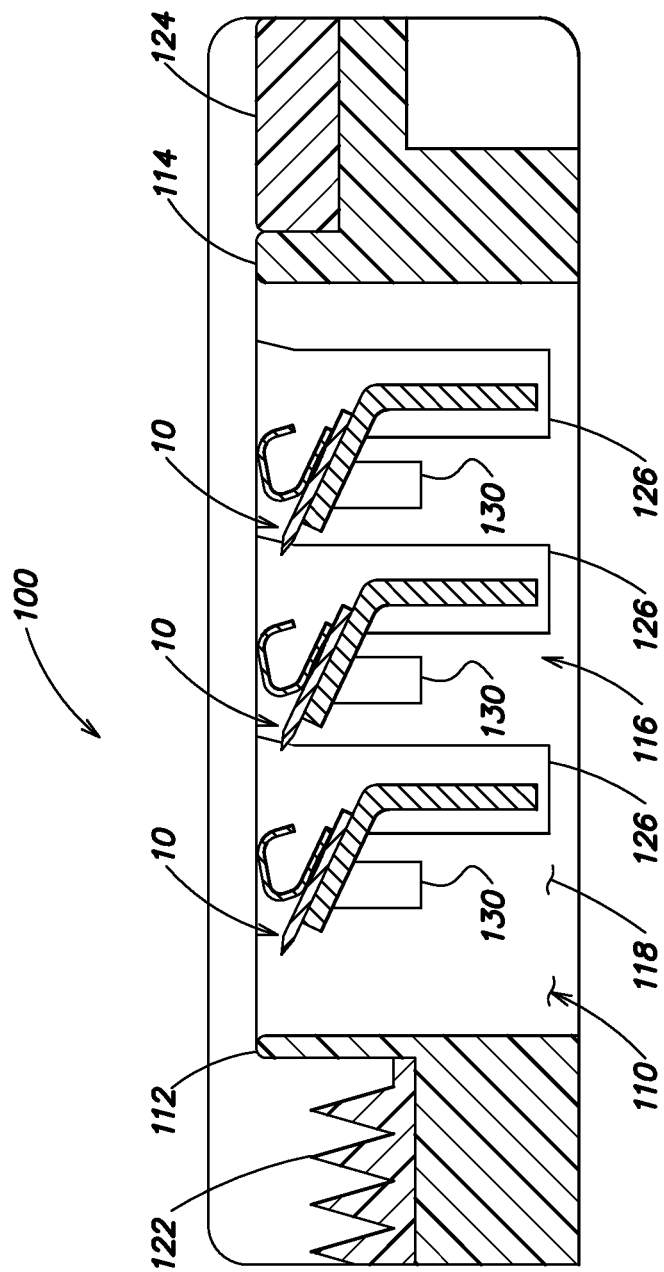
FIG. 3 is a schematic cross section of a razor cartridge including a razor blade and inter-blade guard.

Referring now to FIG. 3 an exemplary schematic cross section of a razor cartridge 100 including a razor blade and inter-blade guard assembly 10 is depicted. The razor cartridge can be generally as disclosed in the aforementioned '255 patent or can be another type of razor cartridge and the present disclosure is not limited to the type of razor cartridge. The razor cartridge can also include more than two razor blade assemblies 10, e.g. three, four or more and the present disclosure is not limited to the number of razor blade assemblies 10 in the razor cartridge. The cartridge includes a housing 110 that comprises a guard 112, a cap 114 and a blade mounting region 116. A (vertical) portion of the blade support 40 is disposed in slots 126 of the end wall 118 of the housing 110 to provide independent movement of each blade assembly under the forces encountered during shaving. The guard and the cap can comprise, respectively, elastomeric and lubricious elements 122, 124, as are well known in the art. A spring element 130 can be provided as is well known in the art.

Figure 4:
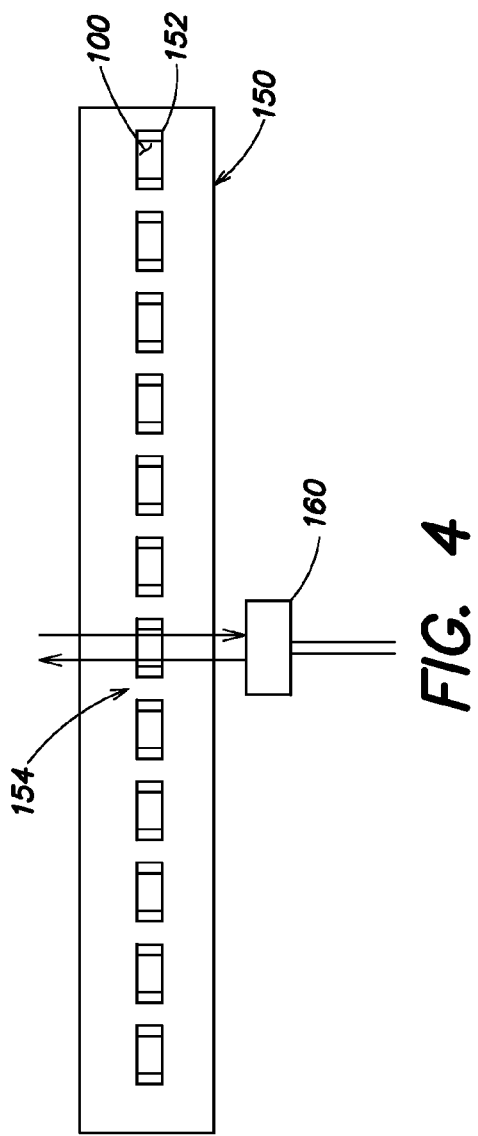
FIG. 4 is a schematic plan view of apparatus to deposit a liquid corrosion inhibitor to a razor cartridge.
Figure 5:
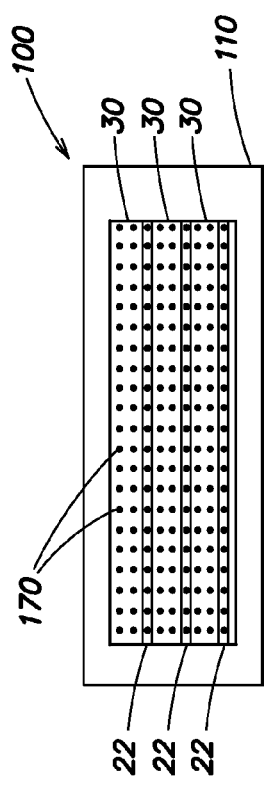
FIG. 5 is a schematic plan view of the razor cartridge of FIG. 3 after processing in the apparatus of FIG. 4.

Referring now to FIG. 4, apparatus for a further advantageous process to inhibit corrosion of a razor blade assembly of a razor cartridge is schematically depicted in plan view. This process can be performed in addition to, or in the alternative to the thermal oxidation process previously described. After assembly of a razor cartridge, e.g. a razor cartridge as depicted in FIG. 3, the razor cartridge 100 is placed on a conveyor 150, preferably in a nest 152 of a conveyor, preferably an indexing conveyor. The razor cartridge is positioned so that the cutting edges and inter-blade guards of the blade assemblies are exposed. During the indexing dwell at position 154 spray head 160 passes over the cartridge preferably in a direction transverse to the direction of motion of the conveyor. The spray head 160 has a controlled spray pattern to deposit a predetermined closely packed array (170 in FIG. 5) of droplets of a liquid rust inhibitor/oil mix on the exposed surfaces of the blade assemblies of the razor cartridge. Preferably the spray pattern is restricted to the aforementioned surfaces of the blade assemblies and is not unnecessarily applied to e.g. outer surfaces of the housing. In order to achieve suitable control of the spray pattern preferably the spray head is an ink jet spray head modified to spray a predetermined array of rust inhibitor/oil mix in place of ink. A suitable ink jet spray head is a SCANTRUE II provided by TRIDENT. Modification of the spray head to be suitable for the aforementioned mix includes replacing the internal seals (e.g. "0" rings) with seals of VITON material to resist deterioration from contact with the aforementioned mix. The rust inhibitor/oil mix is also formulated to have a viscosity approximately equivalent to typical inks used in such ink jet equipment, e.g. about 7-10 centistokes and preferably comprises (each by volume) 10% rust inhibitor such as CRODASINIC-O and/or CRODAZOLINE-O both provided by CRODA INC and more preferably comprises 5% of each rust inhibitor. The mixture further preferably comprises 70% mineral oil such as Naphtha Hydrotreated Heavy oil provided by EXXON MOBIL. The mixture further preferably comprises 20% mineral spirits, e.g. odourless mineral spirits. The rust inhibitor/oil mix preferably avoids separation to its constituent parts over an extended period, e.g. 25 days or more. The rust inhibitor/oil mix also preferably has a surface tension low enough to resist beading on the exposed surfaces of the blade assemblies of the razor cartridge. The spray pattern of the spray head can be programmed by conventional ink jet spray control equipment to spray a closely packed array of droplets as previously mentioned. The spray head can be arranged to pass over each razor cartridge once, twice (i.e. by a forward and back motion synchronized to each index of the conveyor) or more times depending on the desired deposition quantity of the mix. As the spray head is programmable razor cartridges having various exposed blade arrangements can be accommodated, e.g. the exposed arrangement can be rectangular, trapezoidal, oval etc. The total quantity of rust inhibitor/oil mix thus applied can be about 2 mg per razor cartridge. As the rust inhibitor/oil mix is a liquid, some liquid thus applied will flow at least partially into the gap 34 between the razor blade and the inter-blade guard by capillary action. This can delay or prevent the aforementioned ingress of moisture and/or a dilute mildly corrosive substance into the gap and in turn delay or prevent the onset of user-visible electrochemical corrosion. Also as the rust inhibitor/oil mix remains liquid and resists beading, over a short time the droplets will spread and eventually merge with adjacent droplets to provide a substantially continuous film over the applied surfaces. In an accelerated corrosion test as previously described, a razor cartridge treated by this apparatus can have threshold for unacceptable corrosion greater than 2-3 times that of an untreated razor cartridge.

While various embodiments have been described above, it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above described exemplary embodiments, but should be defined only in accordance with the following claims and their equivalents.

What is claimed is:

1. A method of making a razor blade assembly for a razor cartridge, comprising the steps of:
    a) providing a razor blade comprising a stainless steel of a first composition, the razor blade having a first side and a cutting edge extending along a front edge thereof, the razor blade further having been processed to effect a martensitic transformation thereof to harden the razor blade;
    b) providing a chromium oxide layer on the first side by a thermal oxidation process of free chromium, defined as chromium of the stainless steel unreacted with carbon of the stainless steel, at the surface of the stainless steel to enhance corrosion resistance; and
    c) permanently joining an inter-blade guard to the first side of the razor blade, the inter-blade guard comprising a stainless steel of a second composition and including a surface adapted to contact a skin surface of a user during a normal use of the razor cartridge including the razor blade assembly.

2. The method of claim 1, further comprising the step of applying to at least a portion of the first side of the razor blade an array of closely spaced droplets of a liquid adapted to inhibit corrosion of the razor blade.

3. The method of claim 1, further comprising the step of assembling the razor blade assembly to a housing, the resultant assembly comprising the razor cartridge; and
    wherein the step of applying the array of closely spaced droplets of a liquid adapted to inhibit corrosion of the razor blade occurs after the razor blade is assembled to the housing.

4. The method of claim 1, wherein the chromium oxide layer is between about 10 nm and 15 nm thick, and wherein the chromium oxide layer does not substantially alter a color of the first side of the razor blade.

5. A method of making a razor blade assembly for a razor cartridge, comprising the steps of:
    a) providing a razor blade comprising a stainless steel of a first composition, the razor blade having a first side and a cutting edge extending along a front edge thereof;
    b) permanently joining an inter-blade guard to the first side of the razor blade, the inter-blade guard comprising a stainless steel of a second composition and including a surface adapted to contact a skin surface of a user during a normal use of the razor cartridge including the razor blade assembly; and
    c) applying to at least a portion of the first side of the razor blade an array of closely spaced droplets of a liquid adapted to inhibit corrosion of the razor blade.

* * * * *